(12) United States Patent
Nagao et al.

(10) Patent No.: US 10,196,468 B2
(45) Date of Patent: Feb. 5, 2019

(54) METHOD FOR PRODUCING ETHYLENE-VINYL ESTER COPOLYMER, AND SAPONIFIED ETHYLENE-VINYL ESTER COPOLYMER PRODUCT

(71) Applicant: THE NIPPON SYNTHETIC CHEMICAL INDUSTRY CO., LTD., Osaka (JP)

(72) Inventors: Yoshiharu Nagao, Osaka (JP); Shuuichi Fukuyama, Osaka (JP); Kouji Yamada, Osaka (JP); Tomonori Yoshida, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 182 days.

(21) Appl. No.: 15/107,190

(22) PCT Filed: Dec. 22, 2014

(86) PCT No.: PCT/JP2014/083993
§ 371 (c)(1),
(2) Date: Jun. 22, 2016

(87) PCT Pub. No.: WO2015/098885
PCT Pub. Date: Jul. 2, 2015

(65) Prior Publication Data
US 2017/0037168 A1 Feb. 9, 2017

(30) Foreign Application Priority Data
Dec. 27, 2013 (JP) .................................. 2013-270991
Dec. 16, 2014 (JP) .................................. 2014-254191

(51) Int. Cl.
C08F 218/08 (2006.01)
C08F 210/02 (2006.01)
C08F 216/06 (2006.01)
C08F 218/04 (2006.01)
C08F 8/12 (2006.01)
C08J 5/18 (2006.01)

(52) U.S. Cl.
CPC .............. C08F 218/08 (2013.01); C08F 8/12 (2013.01); C08F 210/02 (2013.01); C08F 216/06 (2013.01); C08F 218/04 (2013.01); C08J 5/18 (2013.01); C08J 2329/04 (2013.01)

(58) Field of Classification Search
CPC ...................................................... C08F 218/08
See application file for complete search history.

(56) References Cited

U.S. PATENT DOCUMENTS

2002/0077438 A1    6/2002    Nagao

FOREIGN PATENT DOCUMENTS

| EP | 0 495 495 A2 | 7/1992 |
|---|---|---|
| EP | 0780431 A1 | 6/1997 |
| EP | 1 167 403 A1 | 1/2002 |
| EP | 1 201 688 A2 | 5/2002 |
| JP | H10195145 A | 7/1998 |
| JP | 2001-342202 A | 12/2001 |
| JP | 2002-128807 A | 5/2002 |
| JP | 200389739 A | 3/2003 |
| JP | 2003089740 A | 3/2003 |
| JP | 2003089741 A | 3/2003 |
| JP | 2007089741 A | 3/2003 |
| JP | 2007031725 A | 8/2007 |

OTHER PUBLICATIONS

Levy Process Safety Progress, vol. 12, No. 1, pp. 47-48 (Year: 1993).*
Levy et al. Journal of Applied Polymer Science, vol. 45, 1537-1544 (Year: 1992).*
International Search Report issued with respect to Application No. PCT/JP2014/083993, dated Mar. 10, 2015.
International Preliminary Report on Patentability issued with respect to Application No. PCT/JP2014/083993, dated Jun. 28, 2016.
European Search Report issued with respect to Application No. 14875555.6, dated Jun. 28, 2017.

* cited by examiner

Primary Examiner — Mark S Kaucher
(74) Attorney, Agent, or Firm — Greenblum & Bernstein, P.L.C.

(57) ABSTRACT

The present invention provides a saponified ethylene-vinyl ester copolymer product from which a film having reduced fish eyes can be obtained and a method for producing an ethylene-vinyl ester copolymer that is a precursor thereof. At the time of producing the ethylene-vinyl ester copolymer, as a vinyl ester monomer, the oxygen concentration at storage and/or transportation is adjusted to from 2 to 8 ppm and the oxygen concentration at polymerization is adjusted to less than 2 ppm.

8 Claims, No Drawings

METHOD FOR PRODUCING ETHYLENE-VINYL ESTER COPOLYMER, AND SAPONIFIED ETHYLENE-VINYL ESTER COPOLYMER PRODUCT

TECHNICAL FIELD

The present invention relates to a method for producing an ethylene-vinyl ester copolymer, and more specifically, a method for producing an ethylene-vinyl ester copolymer capable of affording a film having reduced fish eyes when the copolymer is saponified to form a saponified ethylene-vinyl ester copolymer product.

BACKGROUND ART

A saponified ethylene-vinyl ester copolymer product (hereinafter sometimes referred to as "EVOH resin") has a very strong intermolecular force owing to hydrogen bonding of the hydroxyl groups each other present at polymer side chains. Therefore, since the saponified product has high crystallinity and high intermolecular force even in amorphous portions, it is difficult for gas molecules and the like to pass through the EVOH resin and thus the resin exhibits excellent gas barrier properties.

The EVOH resin is produced by saponifying an ethylene-vinyl ester copolymer obtained by copolymerizing ethylene and a vinyl ester monomer.

The vinyl ester monomer to be a raw material of the EVOH resin, for example, vinyl acetate is usually made into a product by reacting ethylene, oxygen, and acetic acid in the presence of a catalyst and purifying the resulting crude product by distillation or the like.

Since vinyl acetate is extremely highly reactive, it is prone to undergoes radical polymerization by heat and further the presence of a metal ion or a peroxide. As a result, heat efficiency is lowered and a transportation pipe is occluded in some cases by attaching and depositing a polymerization product on the walls of a production tank, a storage tank, a distillation column, and a transportation pipe.

Therefore, at the time when vinyl acetate is subjected to polymerization, it is necessary to suppress polymerization during the storage and the like of vinyl acetate and various methods have been proposed.

For example, Patent Document 1 describes that, in order to prevent adverse effects such as polymerization inhibition by oxygen before initiation of the polymerization of a vinyl ester monomer, it is desirable to remove oxygen as far as possible, specifically to control oxygen concentration to 10 ppm or less, preferably 0.1 ppm or less, in a polymerizable mixture (reaction solution etc.) containing the vinyl ester monomer.

That is, since oxygen acts as a polymerization initiator of the vinyl ester monomer, it is a common general technical knowledge that it is preferable to increase the oxygen concentration to such a degree that the vinyl ester monomer is not polymerized, e.g., such a sufficiently high degree as more than 10 ppm at storage or transportation and reduce the oxygen concentration to such a degree that the polymerization of the vinyl ester monomer is not inhibited, e.g., 10 ppm or less at polymerization.

RELATED ART

Patent Document

Patent Document 1: JP-A-2001-342202

SUMMARY OF INVENTION

Problems to be Solved by the Invention

However, it is found that there is a case where resin microspheres called fish eyes are generated when an ethylene-vinyl ester copolymer is produced while increasing the oxygen concentration at storage in the vinyl ester monomer to such a degree that the vinyl ester monomer is not polymerized and decreasing the oxygen concentration such a degree that the polymerization of the vinyl ester monomer is not inhibited by removing oxygen at polymerization and an EVOH resin film is prepared using the obtained ethylene-vinyl ester copolymer.

Therefore, there is desired a saponified ethylene-vinyl ester copolymer product from which a film having reduced fish eyes can be obtained and a method for producing an ethylene-vinyl ester copolymer that is a precursor thereof.

Means for Solving the Problems

As a result of extensive studies in view of the above situations, the present inventors have found that an EVOH resin film having reduced fish eyes is obtained by using a vinyl ester monomer in which oxygen concentration at storage and/or transportation and oxygen concentration at polymerization are adjusted to specific ranges, and thus have accomplished the present invention.

That is, the invention has constitutions of the following [1] to [3].
[1] A method for producing an ethylene-vinyl ester copolymer by copolymerizing a vinyl ester monomer and ethylene, wherein the vinyl ester monomer is stored and/or transported in a state of an oxygen concentration of 2 to 8 ppm and subsequently is used for the polymerization with adjusting the oxygen concentration to less than 2 ppm.
[2] The method for producing an ethylene-vinyl ester copolymer according to [1], wherein the vinyl ester monomer after storage and/or transportation is copolymerized at an oxygen concentration of 1 ppm or less.
[3] A saponified ethylene-vinyl ester copolymer product, which is obtained by saponifying the ethylene-vinyl ester copolymer obtained by the production method according to [1] or [2].

That is, the invention is characterized by using, as the vinyl ester monomer, one which has an appropriate oxygen concentration at storage and from which oxygen is removed as far as possible at polymerization, at the time of producing the ethylene-vinyl ester copolymer.

Effects of the Invention

The present invention has an effect that a film using an EVOH resin obtained from the ethylene-vinyl ester copolymer that is a resulting product of the production method of the invention has reduced fish eyes.

EMBODIMENTS FOR CARRYING OUT THE INVENTION

The following will describe the constitutions of the invention in detail but these show some examples of desired embodiments and the invention is not specified to these contents.

<Ethylene-Vinyl Ester Copolymer>

At the production of an ethylene-vinyl ester copolymer, polymerization is usually performed while charging ethylene and a vinyl ester monomer, a polymerization solvent and a polymerization catalyst (polymerization initiator), and the like in a polymerization (reaction) vessel. In the invention, it is the most characteristic feature to use, as the vinyl ester monomer, one which has an appropriate oxygen concentration at storage/transportation and from which oxygen is removed as far as possible at polymerization. If the oxygen concentration is satisfied, known methods can be adopted for the other conditions and, for example, either of a continuous type and a batch type may be used and the other polymerization conditions may be appropriately set according to each polymerization mode.

First, there will be described the vinyl ester monomer to be used in the invention.

[Vinyl Ester Monomer]

As the vinyl ester monomer to be used in the invention, vinyl acetate is typically used from the viewpoints of good commercial availability and impurity-treating efficiency at the production. Besides, there may be mentioned, for example, aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate; aromatic vinyl esters such as vinyl benzonate; and the monomer is an aliphatic vinyl ester having usually 3 to 20 carbon atoms, preferably 4 to 10 carbon atoms, particularly preferably 4 to 7 carbon atoms. They are usually used alone, but a plurality thereof may be simultaneously used, as occasion demand.

The oxygen concentration in the vinyl ester monomer at storage is 2 to 8 ppm, preferably 2 to 6 ppm, and particularly preferably 3 to 5 ppm based on the vinyl ester monomer. In the case where such oxygen concentration is too low, the stability of the vinyl ester monomer decreases and it tends to polymerize alone, i.e., to form a homopolymer of the vinyl ester monomer. On the other hand, in the case where the oxygen concentration is too high, fish eyes tend to be generated when an ethylene-vinyl ester copolymer and an EVOH resin film are prepared using the vinyl ester monomer stored at such oxygen concentration.

Incidentally, the oxygen concentration in the vinyl ester monomer can be measured using gas chromatography.

The invention has the most characteristic feature that the oxygen concentration at the storage is adjusted to a predetermined range.

The fish eyes in the invention refer to microspheres of resins formed in the EVOH resin film using the vinyl ester monomer as a raw material. When such fish eyes are present, there are adverse influences, for example, defective appearance of a film and a sheet and also a decrease in mechanical performance such as a decrease in stretchability. Upon visual observation of a film or a sheet in the range of 10 cm×10 cm, the defective appearance and the decrease in mechanical performance of the film or sheet can be suppressed when the number of fish eyes having a diameter of 0.1 mm or more to less than 0.2 mm is 30 pieces or less and the number of fish eyes having a diameter of 0.2 mm or more is 2 pieces or less.

As a cause of the generation of the fish eyes, it is considered that the generation is attributable to an oxidative degradation reaction of the vinyl ester monomer with oxygen during storage. That is, materials incompatible to the EVOH resin are formed by the transformation of the oxidative degradation products into a high-molecular-weight ones and the incorporation of the products into the main resin and, as a result, it is considered that the materials become the fish eyes. Accordingly, by adjusting the oxygen concentration in the vinyl ester monomer at storage to from 2 to 8 ppm based on the vinyl ester monomer, the generation of the fish eyes in the obtained EVOH resin can be suppressed with maintaining the stability of the vinyl ester monomer.

The temperature of the vinyl ester monomer during storage is usually preferably 38° C. or lower, and particularly preferably 35° C. or lower. When the storage temperature is too high, there is a possibility that the vinyl ester monomer initiates polymerization by itself.

The pressure of the vinyl ester monomer during storage is not categorically mentioned but it is preferably managed under a pressure of 1 to 10 kPa with filling the inside of the system with an inert gas.

As the inert gas, for example, nitrogen, argon, helium, and the like may be mentioned but, in general, nitrogen is preferably used.

Incidentally, at the time of long-term storage, it is preferred to appropriately adjust the oxygen concentration, the temperature of the monomer, and the pressure of the monomer so as to fall within the above ranges.

As methods for adjusting the oxygen concentration in the vinyl ester monomer at storage, for example, there may be mentioned a method of distillation, a method of bubbling with an inert gas, and a method of making the inside of the system inert gas atmosphere and renewing the gas-liquid interface, in the case of decreasing the oxygen concentration, and as the method of renewing the interface, stirring and fluidization and the like may be mentioned. On the other hand, in the case of increasing the oxygen concentration, there may be mentioned a method of making the inside of the system oxygen or air atmosphere and renewing the gas-liquid interface, and as the method of renewing the interface, stirring and fluidization and the like may be mentioned.

As the inert gas, for example, nitrogen, argon, helium, and the like may be mentioned but, in general, nitrogen is preferably used.

The step of adjusting the oxygen concentration in the vinyl ester monomer is inevitable for suppressing the polymerization of the vinyl ester monomer and includes not only the storage step of storing/keeping the produced and purified vinyl ester monomer but also, for example, a transportation step of transferring/transporting the stored/kept vinyl ester monomer. Furthermore, a circulation system and a recovering system, such as peripheral equipments and instruments in contact with a process solution containing the vinyl ester monomer at each step may be objects of polymerization suppression.

For example, there may be mentioned a keeping tank and a storage tank in the storage step, a transfer tank and a transportation tank, a transfer line, and the like in the transportation step.

The thus stored vinyl ester monomer is then subjected to polymerization but the oxygen concentration in the vinyl ester monomer at polymerization is theoretically preferably such a degree that oxygen is removed as far as possible, and is less than 2 ppm and preferably 1 ppm or less based on the vinyl ester monomer. Substantially, it is considered that the polymerization suppression with oxygen is not present when the oxygen concentration is 1 ppm or less. In the case where the oxygen concentration is too high, the reactivity of the vinyl ester monomer decreases and the oxygen in the polymerization solution acts as a polymerization suppressor and thus the polymerization tends to be less prone to proceed.

A lower limit of the oxygen concentration is not particularly limited but, since it is usually difficult to maintain the oxygen concentration continuously at less than 1 ppm industrially in some cases, it is suitable to perform the polymerization of the vinyl ester monomer under an oxygen concentration of around 1 ppm.

Incidentally, the oxygen concentration in the vinyl ester monomer can be measured using gas chromatography.

As methods for decreasing the oxygen concentration in the vinyl ester monomer during polymerization, for example, there may be mentioned a method of distillation, a method of bubbling with an inert gas, and a method of making the inside of the system inert gas atmosphere and renewing the gas-liquid interface, and as the method of renewing the interface, stirring and fluidization and the like may be mentioned.

As the inert gas, for example, nitrogen, argon, helium, and the like may be mentioned but, in general, nitrogen is preferably used.

[Ethylene-Vinyl Ester Copolymer]

As a method of introducing ethylene into the copolymer, it is suitable to perform usual ethylene-pressurized polymerization and it is possible to control the amount thereof to be introduced by the pressure of ethylene. The pressure is not categorically mentioned depending on the objective ethylene content but is usually selected from the range of 2.5 to 8.0 MPa.

As the solvent to be used for the copolymerization, there may be usually mentioned lower alcohols such as methanol, ethanol, propanol, and butanol, ketones such as acetone and methyl ethyl ketone, and the like. Methanol is suitably used from an industrial point of view.

The amount of the solvent to be used may be appropriately selected depending on the objective polymerization degree of the copolymer, with considering the chain transfer constant of the solvent. For example, when the solvent is methanol, the amount is selected from the range of S (solvent)/M (monomer)=0.01 to 10 (weight ratio), preferably around 0.05 to 7 (weight ratio).

A polymerization catalyst is used for copolymerization. Examples of the polymerization catalyst include known radical polymerization catalysts such as azobisisobutyronitrile, acetyl peroxide, benzoyl peroxide, and lauryl peroxide and radical polymerization catalysts active at low temperature such as peroxy esters including t-butyl peroxyneodecanoate, t-butyl peroxypivalate, α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, and t-hexyl peroxypivalate; peroxydicarbonates including di-n-propyl peroxydicarbonate, di-iso-propyl peroxydicarbonate, di-sec-butyl peroxydicarbonate, bis(4-t-butylcyclohexyl) peroxydicarbonate, di-2-ethoxyethyl peroxydicarbonate, di(2-ethylhexyl) peroxydicarbonate, dimethoxybutyl peroxydicarbonate, and di(3-methyl-3-methoxybutylperoxy)dicarbonate; and diacyl peroxides including 3,3,5-trimethylhexanoyl peroxide, diisobutyryl peroxide, and lauroyl peroxide.

The amount of the polymerization catalyst to be used varies depending on the type of catalyst and is not categorically determined but is arbitrarily selected according to the polymerization rate. For example, in the case where azobisisobutyronitrile or acetyl peroxide is used, the amount is preferably 0.001 to 0.2 part by weight, and particularly preferably from 0.005 to 0.1 part by weight, based on 100 parts by weight of the vinyl ester monomer.

In the invention, a hydroxylactone compound or hydroxycarboxylic acid is preferably co-present together with the catalyst, from the viewpoint that the color tone of the obtained resin composition becomes satisfactory (approaching to colorless). The hydroxylactone compound is not particularly limited as long as it is a compound having a lactone ring and a hydroxyl group in the molecule. Examples thereof include L-ascorbic acid, erythorbic acid, and gluconodeltalactone, and L-ascorbic acid or erythorbic acid is suitably used. Examples of the hydroxycarboxylic acid include glycolic acid, lactic acid, glyceric acid, malic acid, tartaric acid, citric acid, and salicylic acid, and citric acid is suitably used.

The amount of the hydroxylactone compound or hydroxycarboxylic acid to be used is preferably 0.0001 to 0.1 part by weight, more preferably 0.0005 to 0.05 part by weight, and particularly preferably 0.001 to 0.03 part by weight based on 100 parts by weight of the vinyl ester monomer, in either case of a batch type and a continuous type. When the amount is too small, the effects of co-presence may not be obtained sufficiently and, on the other hand, when the amount is too large, polymerization of the vinyl ester monomer is inhibited, so that the cases are not preferable. The method of charging the compound into the reaction system is not particularly limited, but usually the compound is diluted by a solvent such as a lower aliphatic alcohol (methanol, ethanol, propanol, tert-butanol, or the like), an aliphatic ester (methyl acetate, ethyl acetate, or the like) including the vinyl ester monomer, or water or a mixed solvent thereof and then charged into the polymerization system.

The reaction temperature of the copolymerization reaction is not categorically mentioned depending on the solvent to be used and the pressure but the reaction is usually performed at a temperature equal to or lower than the boiling point of the solvent and the temperature is usually preferably 40 to 80° C., and particularly preferably 55 to 80° C. When the temperature is too low, the polymerization takes a long period of time and a large amount of the catalyst is required for shortening the polymerization time and, on the other hand, when the temperature is too high, polymerization control becomes difficult and thus the cases are not preferable.

Moreover, the polymerization time is preferably 4 to 10 hours, and further preferably 6 to 9 hours in the case of the batch type. When the polymerization time is too short, it is necessary to elevate the polymerization temperature or set the amount of the catalyst large and, on the other hand, when the polymerization time is too long, there arises a problem in view of productivity and thus the cases are not preferable. In the case of the continuous type, the average residential time in the polymerization vessel is preferably 2 to 8 hours, and further preferably 2 to 6 hours. When the residential time is too short, it is necessary to elevate the polymerization temperature or set the amount of the catalyst large and, on the other hand, when the residential time is too long, there arises a problem in view of productivity and thus the cases are not preferable.

The polymerization rate of the vinyl ester monomer is set high as far as possible within the range where the polymerization control is possible, from the viewpoint of productivity and is preferably 20 to 90%. When the polymerization rate is too low, there arise a problem in view of productivity and such problems that a large amount of the unpolymerized vinyl ester monomer is present and, on the other hand, when the polymerization rate is too high, the polymerization control becomes difficult and thus the cases are not preferable.

Thus, there is obtained the ethylene-vinyl ester copolymer useful for obtaining an EVOH resin film having reduced fish eyes, by the production method of the invention. For saponification of the ethylene-vinyl ester copolymer, known methods can be adopted.

The EVOH resin to be used in the invention is a resin usually obtained by copolymerizing ethylene and a vinyl ester monomer and subsequently saponifying the resulting product, and is a water-insoluble thermoplastic resin.

That is, the EVOH resin contains ethylene structural units and vinyl alcohol structural units as main units and a minute amount of unsaponified remaining vinyl ester structural units.

At the saponification, it is performed with an alkali catalyst or an acid catalyst in a state that the copolymer obtained above is dissolved in an alcohol or a hydrous alcohol. As the alcohol, there may be mentioned methanol, ethanol, propanol, tert-butanol, and the like but methanol is particularly preferably used. The concentration in the copolymer in the alcohol is appropriately selected depending on the viscosity of the system but is usually selected from the range of 10 to 60% by weight. As the catalyst to be used for the saponification, there may be mentioned alkali catalysts such as alkali metal hydroxides and alcoholates including sodium hydroxide, potassium hydroxide, sodium methylate, sodium ethylate, potassium methylate, and lithium methylate or the like; and acid catalysts such as sulfuric acid, hydrochloric acid, nitric acid, methanesulfonic acid, zeolite, and cation-exchange resins.

The amount of the saponification catalyst to be used is appropriately selected depending on the method for saponification, the target saponification degree, and the like, but when an alkali catalyst is used, the amount is usually suitably 0.001 to 0.1 equivalent, and preferably 0.005 to 0.05 equivalent, based on the total amount of monomers such as the vinyl ester monomer. With regard to the method for saponification, any one of batch-type saponification, continuous saponification on a belt, and tower-type continuous saponification is possible depending on the target saponification degree or the like. A tower-type saponification under a certain pressurization is preferably used for the reasons that the amount of the alkali catalyst at the saponification can be reduced and the saponification reaction easily proceeds with high efficiency.

Moreover, the pressure at the saponification is not categorically mentioned depending on the target ethylene content, but is selected from the range of 0.1 to 0.8 MPa, the saponification temperature is 80 to 150° C., and preferably 100 to 130° C., and the saponification time is selected form 0.5 to 3 hours.

Thus, the EVOH resin is obtained but, in the invention, the etylene content, saponification degree, and melt flow rate (MFR) (210° C., loading of 2,160 g) of the obtained EVOH resin are not particularly limited.

The ethylene content of the EVOH resin is usually 20 to 60 mol %, preferably 21 to 55 mol %, particularly preferably 25 to 50 mol %, and especially 29 to 48 mol %. In the case where the content is too low, gas barrier properties and appearance of the resulting molded article, especially a stretched film at high humidity tends to decrease. On the other hand, in the case where the content is too high, the gas barrier properties of the stretched film tends to decrease.

The ethylene content can be measured in accordance with, for example, ISO14663-1 (1999).

The saponification degree of the vinyl ester component in the EVOH resin is usually 90 mol % or more, preferably 93 to 99.99 mol %, and particularly preferably 98 to 99.99 mol %. In the case where the saponification degree is too low, gas barrier properties, humidity resistance, and the like of the stretched film tend to decrease and thus the case is not preferable.

The saponification degree of the vinyl ester component can be measured in accordance with, for example, JIS K6726 (1994) (incidentally, the EVOH resin is measured as a solution obtained by homogeneously dissolving the resin in a water/methanol solvent).

The melt flow rate (MFR) (210° C., loading of 2,160 g) of the EVOH resin is usually 1 to 100 g/10 min, preferably 2 to 50 g/10 min, and particularly preferably 3 to 30 g/10 min. In the case where MFR is too large, the mechanical strength of the molded article tends to get worse. In the case where MFR is too small, extrusion processability tends to get worse.

Moreover, the EVOH resin to be used in the invention may further contain structural units derived from comonomers to be shown below. The comonomers are α-olefins such as propylene, isobutene, α-octene, α-dodecene, and α-octadecene; hydroxyl group-containing α-olefins such as 3-butene-1-ol, 4-penten-1-ol, 3-butene-1,2-diol, and hydroxyl group-containing α-olefin derivatives such as esterified products, acylated products, and the like thereof; unsaturated carboxylic acids or salts thereof, partial alkyl esters, complete alkyl esters, nitriles, amides, and anhydrides thereof, unsaturated sulfonic acids or salts thereof; comonomers such as vinylsilane compounds, vinyl chloride, and styrene.

Furthermore, a "post-modified", e.g., urethanated, acetalized, cyanoethylated, or oxyalkylenated EVOH resin may be also used.

Of the modified products as above, an EVOH resin having a primary hydroxyl group introduced into the side chain by copolymerization is preferable from the viewpoint that secondary formability such as stretching treatment or vacuum/air-pressure forming is satisfactorily performed. Particularly, an EVOH resin having a 1,2-diol structure in a side chain is preferable.

The EVOH resin obtained by such a method can be used as it is but may contain additive(s) which is generally blended into EVOH resins, for example, a heat stabilizer, an antioxidant, an antistatic agent, a colorant, a ultraviolet absorbent, a lubricant, a plasticizer, a light stabilizer, a surfactant, an antimicrobial agent, a drying agent, an anti-blocking agent, a flame retardant, a crosslinking agent, a curing agent, a blowing agent, a nucleating agent, an anti-fogging agent, an additive for biodegradation, a silane coupling agent, an oxygen absorbent, and the like, within the range where the effect of the invention is not impaired.

As the heat stabilizer, for the purpose of improving various physical properties such as heat stability at melt-molding, there may be added additives, for example, organic acids such as acetic acid, propionic acid, butyric acid, lauric acid, stearic acid, oleic acid, and behenic acid or salts such as alkali metal salts (sodium, potassium, etc.), alkaline earth metal salts (calcium, magnesium, etc.), and zinc salts thereof; or inorganic acids such as sulfuric acid, sulfurous acid, carbonic acid, phosphoric acid and boric acid or salts such as alkali metal salts (sodium, potassium, etc.), alkaline earth metal salts (calcium, magnesium, etc.), and zinc salts thereof, and the like.

Of these, particularly, it is preferable to add acetic acid, a boron compound including boric acid and salts thereof; an acetate salt, or a phosphate salt.

In the case of adding acetic acid, the addition amount thereof is usually 0.001 to 1 part by weight, preferably 0.005 to 0.2 part by weight, and particularly preferably 0.010 to 0.1 part by weight based on 100 parts by weight of the EVOH resin. When the addition amount of acetic acid is too small, there is a tendency that the containing effect of acetic acid is not obtained sufficiently and, on the other hand, when the amount is too large, there is a tendency that a homogeneous film becomes difficult to obtain.

Moreover, in the case of adding a boron compound, the addition amount thereof is usually 0.001 to 1 part by weight, preferably 0.002 to 0.2 part by weight, and particularly preferably 0.005 to 0.1 part by weight, converted to boron (after ashing, analyzed by ICP emission spectrometry), based on 100 parts by weight of the EVOH resin. When the addition amount of the boron compound is too small, there is a tendency that the addition effect of the boron compound is not obtained sufficiently and, on the other hand, when the amount is too large, there is a tendency that a homogeneous film becomes difficult to obtain.

Furthermore, the addition amount of an acetate salt or a phosphate salt (including a hydrogen phosphate salt) is usually 0.0005 to 0.1 part by weight, preferably 0.001 to 0.05 part by weight, and particularly preferably 0.002 to 0.03 part by weight, converted to metal (after ashing, analyzed by ICP emission spectrometry), based on 100 parts by weight of the EVOH resin. When the addition amount thereof is too small, there is a tendency that the containing effect thereof is not obtained sufficiently and, on the other hand, when the amount is too large, there is a tendency that a homogeneous film becomes difficult to obtain. Incidentally, in the case of adding two or more salts to the EVOH resin, the total amount preferably falls within the above range of the addition amount.

The method of adding acetic acid, the boron compound, the acetate salt, or the phosphate salt to the EVOH resin is not particularly limited and includes (i) a method of bringing porous precipitates of the EVOH resin having a water content of 20 to 80% by weight into contact with an aqueous solution of the additive to incorporate the additive into the porous EVOH resin and then drying them; (ii) a method of incorporating the additive into a homogeneous solution (water/alcohol solution and the like) of the EVOH resin, then extruding the mixture in a strand shape into a coagulation solution, then cutting the obtained strand to prepare pellets, and performing drying treatment; (iii) a method of collectively mixing the EVOH resin with the additive and then melt-kneading the mixture by means of an extruder or the like; (iv) a method of neutralizing alkali (sodium hydroxide, potassium hydroxide, and the like) used in the saponification step with an organic acid such as acetic acid at the production of the EVOH resin and adjusting the amount of the remaining organic acid such as acetic acid and salts that are formed as by-products, by the treatment of water rinsing; and the like.

In order to more remarkably obtain the effect of the present invention, the methods of (i) and (ii) that are superior in the ability of dispersing the additive and the method of (iv) in the case where an organic acid and a salt thereof are incorporated are preferable.

<Use Applications of EVOH Resin>

The thus obtained EVOH resin of the invention can be formed into films, sheets, cups, bottles, and so on by melt-molding. As the melt-molding method, extrusion molding methods (T-die extrusion, inflation extrusion, blow molding, melt spinning, contour extrusion, etc.) and injection molding method are mainly adopted. The melt-molding temperature is normally selected from the range of 150 to 300° C. in many cases.

The molded articles may be used for various use applications as they are but are usually laminated with another substrate to form laminates for further increasing the strength and imparting another function.

As the other substrate, a thermoplastic resin is useful. Examples of the thermoplastic resins include polyethylenes such as linear low density polyethylene, low density polyethylene, ultra-low density polyethylene, middle density polyethylene, and high density polyethylene; polyolefins such as polypropylene, ethylene-propylene (block and random) copolymers, propylene-α-olefin (α-olefin having 4 to 20 carbon atoms) copolymers, polybutene, and polypenten; grafted polyolefins obtained by graft-modification of these polyolefins with an unsaturated carboxylic acid or an ester thereof, ionomers, ethylene-vinyl acetate copolymers, ethylene-acrylic acid copolymers, ethylene-acrylic acid ester copolymers, polyester-based resins, polyamide-based resins (including copolymerized polyamides), polyvinyl chloride, polyvinylidene chloride, acryl-based resins, polystyrene, vinyl ester-based resins, polyester elastomers, polyurethane elastomers, halogenated polyolefins such as chlorinated polyethylene and chlorinated polypropylene; aromatic or aliphatic polyketones, polyalcohols obtained by reducing them, and the like. From the viewpoint of practical uses such as physical properties (particularly strength) of the laminates, polyolefin-based resin and polyamide-based resin are preferred and particularly, polyethylene and polypropylene are preferably used.

These substrate resins may contain an antioxidant, an antistatic agent, a lubricant, a nucleating-agent material, an antiblocking agent, an ultraviolet absorbent, wax, and the like which are hitherto known, within the range where the purpose of the invention is not inhibited.

With regard to the lamination method of laminating the EVOH resin of the invention on the other substrate, any known method can be adopted. For example, there may be mentioned a method of melt-extrusion lamination of the other substrate on a film or sheet of the EVOH resin of the invention; a method of melt-extrusion lamination of the resin on the other substrate reversely, a method of co-extruding the resin and the other substrate; a method of dry lamination of the resin (layer) on the other substrate (layer) using a known adhesive such as an organic titanium compound, an isocyanate compound, a polyester-based compound, or a polyurethane compound; and a method of applying a solution of the resin on the other substrate and then removing the solvent.

Of these methods, the method of co-extruding is preferred from the viewpoints of cost and environment.

As a layer composition of the laminate, when a layer containing the EVOH resin of the invention is referred to as a (a1, a2, . . . ) and a thermoplastic resin-containing layer is referred to as b (b1, b2, . . . ), not only the double layer structure of a/b but also arbitrary combinations such as b/a/b, a/b/a, a1/a2/b, a/b1/b2, b2/b1/a/b1/b2, and b2/b1/a/b1/a/b1/b2 are possible. Moreover, when a recycled layer containing a mixture of the EVOH resin and the thermoplastic resin is referred to as R, b/R/a, b/R/a/b, b/R/a/R/b, b/a/R/a/b, b/R/a/R/a/R/b, and the like are also possible, the recycled layer being obtained by re-melt-molding of edges, defective products, and the like generated in the production of the laminate.

Incidentally, in the above layer composition, an adhesive resin layer can be provided at respective interlayers, if necessary. As the adhesive resin, a known one may be used. The adhesive resin varies depending on the kind of the resin of the b layer and hence may be appropriately selected. Typically, there may be mentioned a modified olefin polymer containing carboxyl groups obtained by chemically bonding an unsaturated carboxylic acid or its anhydride to a polyolefin resin by an addition reaction, a graft reaction, or the like. For example, there are maleic anhydride-graft-modified polyethylene, maleic anhydride-graft-modified polypropylene, maleic anhydride-graft-modified ethylene-propylene (block and random) copolymers, maleic anhydride-graft-modified ethylene-ethyl acrylate copolymers, maleic anhydride-graft-modified ethylene-vinyl acetate copolymers, and the like. One kind or a mixture of two or more kinds selected from them is preferred. Moreover, it is also possible to blend the EVOH composition or other EVOH resin, rubber elastomer components such as polyisobutylene and ethylene-propylene rubber and further, the resin of the b layer and the like can be blended with these adhesive resins. In particular, the adhesiveness is sometimes improved by blending a polyolefin resin different from the polyolefin resin that is a matrix of the adhesive resin and thus the case is useful.

The laminate as mentioned above may be subsequently subjected to a (heat) stretching treatment, if necessary. The (heat) stretching treatment means an operation by which a film or sheet-shaped laminate uniformly heated thermally is uniformly formed into a tube or a film shape by a chuck, a plug, vacuum force, air pressure force, blow, and the like. The stretching may be either uniaxial stretching or biaxial stretching and, in the case of biaxial stretching, it may be simultaneous stretching or sequential stretching.

As the stretching method, there can be adopted a method having high stretching magnification among a roll stretching method, a tenter stretching method, a tubular stretching method, a stretch blow method, a vacuum/air-pressure forming, and the like. In the case of the biaxial stretching, either of a simultaneous biaxial stretching mode and a successive biaxial stretching mode can be adopted. The stretching temperature is selected from the range of usually around 40 to 170° C., preferably about 60 to 160° C. When the stretching temperature is too low, stretchability becomes poor. When the stretching temperature is too high, it becomes difficult to maintain a stable stretched state.

Incidentally, for the purpose of imparting dimensional stability after stretching, thermal setting may be subsequently performed. The thermal setting is a well-known method and is practicable. For example, the above stretched film is subjected to a heat treatment usually at from 80 to 180° C., preferably from 100 to 165° C., usually for around 2 to 600 seconds with keeping the film in a tension state.

Moreover, in the case where the multilayer stretched film obtained from the EVOH resin of the invention is used as a shrinkable film, in order to impart thermal shrinking ability, the above thermal setting is not performed and, for example, a treatment of applying a cool air to the film after stretching to undergo setting under cooling.

The thickness of each of the thermoplastic resin layer and the adhesive resin layer of the laminate is not categorically mentioned depending on the layer composition, the kind of the thermoplastic resin, the kind of the adhesive resin, use applications, packaging mode, physical properties to be requested, and the like, but is selected from a range of usually 10 to 1000 μm, preferably 50 to 500 μm for the thermoplastic resin layer, and is selected from a range of 5 to 500 μm, preferably about 10 to 250 μm for the adhesive resin layer.

Moreover, the thickness of the layer containing the EVOH resin of the invention varies depending on the gas barrier properties to be required and the like, but is usually 5 to 500 μm, preferably 10 to 250 μm, and particularly preferably 20 to 100 μm. When the thickness is too thin, there is a tendency that sufficient gas barrier properties are not obtained and, on the other hand, when it is too thick, the flexibility of the film tends to be insufficient.

In the case where another substrate is further applied by extrusion coating on the obtained laminate or a film or sheet of the other substrate is laminated thereon using an adhesive, arbitrary substrates (paper, metal foil, a uniaxially or biaxially stretch plastic film or sheet and an article thereof deposited with an inorganic substance, fabric, non-woven fabric, metal cotton, wooden article, and the like) can be used as the other substrate other than the aforementioned thermoplastic resin.

Bags and containers including cups, trays, tubes, bottles, and the like and lids thereof, made of the film, sheet, or stretched film obtained as described above are useful for various packaging containers for common foods, seasonings such as mayonnaise and dressing, fermented foods such as miso, fat and oil foods such as salad oil, drinks, cosmetics, medicaments, and the like.

EXAMPLES

The present invention will be specifically described with reference to Examples. However, the invention is not limited to the description of Examples, as long as it does not depart from the gist of the invention.

Incidentally, "part(s)" in the examples are on the weight basis, unless otherwise indicated.

Example 1

Adjustment of Oxygen Concentration in Vinyl Ester Monomer at Storage

Vinyl acetate was purified by distillation beforehand to adjust the oxygen concentration to from 0 to 1 ppm. Furthermore, at the time of charging the vinyl acetate into a storage tank, the oxygen concentration in the vinyl acetate was adjusted to 3 ppm by simultaneously injecting a mixed gas of air:nitrogen=1:10. Moreover, the inside of the system was adjusted to 6 kPa and the vinyl acetate was kept at 30° C.

Incidentally, the oxygen concentration in vinyl acetate was measured using gas chromatography.
[Adjustment of Oxygen Concentration in Vinyl Ester Monomer at Polymerization]

The oxygen concentration in vinyl acetate was adjusted to 1 ppm by nitrogen bubbling into vinyl acetate in which oxygen concentration had been adjusted to 3 ppm.

Incidentally, the oxygen concentration in vinyl acetate was measured using gas chromatography.
[Production of Ethylene-Vinyl Ester Copolymer]

Using a polymerization vessel fitted with a stirring machine, polymerization for an ethylene-vinyl acetate copolymer was continuously carried out under the following conditions.
(Polymerization Conditions)

| | |
|---|---|
| Supply amount of vinyl acetate in which oxygen concentration was adjusted to 1 ppm | 2600 parts/hr |
| Supply amount of methanol | 450 parts/hr |
| Supply amount of peroxy ester (polymerization catalyst) | 0.29 part/hr |
| Polymerization temperature | 67° C. |
| Pressure of ethylene | 4 MPa |
| Average residential time | 3.5 hr |

The ethylene content of the ethylene-vinyl acetate copolymer obtained on this occasion was 32 mol % and the polymerization rate of vinyl acetate was 38%.

[Production of Saponified Ethylene-Vinyl Ester Copolymer Product]

To 100 parts of a methanol solution containing 50% of the ethylene-vinyl acetate copolymer, 150 parts of a methanol solution containing 0.015 equivalent of sodium hydroxide based on the vinyl acetate group in the copolymer was supplied, and a saponification reaction was carried out at from 100 to 110° C. under a pressure of 0.30 MPa for 80 minutes. The resin concentration in the resulting methanol solution of the saponified ethylene-vinyl acetate copolymer product (saponification degree of 99.8 mol %) was 30%. Then, 60 parts of an aqueous methanol solution having a water content of 62.5% was supplied to the methanol solution of the saponified ethylene-vinyl acetate copolymer product under azeotropic conditions and methanol was distilled off at from 100 to 110° C. under a pressure of 0.20 MPa until the resin concentration in the methanol/water solution of the saponified ethylene-vinyl acetate copolymer product became 400/%, thereby obtaining a completely transparent methanol/water homogeneous solution.

Subsequently, the obtained methanol/water solution of the saponified ethylene-vinyl acetate copolymer product was extruded into a coagulation solution tank composed of a water/methanol solution (weight ratio of 95/5) in a strand shape. The strand was cut with a cutter to obtain porous pellets. The obtained pellets are uniform in shape and no deformed one was present. The pellets were charged into a warm water at 35° C. and stirring was performed for about 4 hours to obtain porous pellets having a water content of 50%. Thereafter, the pellets were dried to obtain a saponified ethylene-vinyl acetate copolymer product (cylindrical semi-transparent pellets having an average diameter of 3.2 mm and an average length of 3.5 mm) having a water content of 0.3%.

[Evaluation of Fish Eyes]

The above pellets of the saponified ethylene-vinyl acetate copolymer product were formed into a film under the following condition to obtain a monolayer film having a thickness of 30 μm.

(Film Forming Conditions)
Extruder: diameter (D) of 40 mm, LD=28
Screw: full flight type, compression ratio=2.7
Screen pack: 100/100 mesh
Die: width of 400 mm, coat hanger type
Set temperature: C1/C2/C3/C4/A/D=180/190/200/210/210/210° C.
Number of rotations of screw: 30 rpm
Roll temperature: 70° C.

With regard to the obtained monolayer film having a thickness of 30 μm, the number of fish eyes having a diameter of 0.1 mm or more and less than 0.2 mm and the number of fish eyes having a diameter of 0.2 mm or more were visually counted in the range of 10 cm×10 cm.

Table 1 shows evaluation results thereof.

Example 2

An EVOH resin film was prepared in the same manner as in Example 1 except that the oxygen concentration in vinyl acetate at storage was changed to 5 ppm in Example 1 and was evaluated in the same manner as in Example 1.

Comparative Example 1

An EVOH resin film was prepared in the same manner as in Example 1 except that the oxygen concentration in vinyl acetate at storage was changed to 9 ppm in Example 1 and was evaluated in the same manner as in Example 1.

Comparative Example 2

When the oxygen concentration in vinyl acetate at storage was changed to 1 ppm in Example 1, the strainer of a transportation pipe was occluded owing to homopolymerization of vinyl acetate in the storage tank and hence it was impossible to supply vinyl acetate to the polymerization vessel. As a result, it was impossible to produce an ethylene-vinyl acetate copolymer.

TABLE 1

| | Oxygen concentration in vinyl acetate at storage (ppm) | Oxygen concentration in vinyl acetate at polymerization (ppm) | Number of fish eyes (piece) | |
|---|---|---|---|---|
| | | | diameter of 0.1 mm or more to less than 0.2 mm | diameter of 0.2 mm or more |
| Example 1 | 3 | 1 | 20 | 1 |
| Example 2 | 5 | 1 | 30 | 1 |
| Comparative Example 1 | 9 | 1 | 40 | 3 |
| Comparative Example 2 | 1 | 1 | — | — |

From Comparative Example 1, in the case where the oxygen concentration in the vinyl ester monomer at storage exceeds the specific range of the present application, it is understood that many fish eyes are generated when an EVOH resin film is formed using the vinyl ester monomer as a raw material.

Namely, when Examples 1 and 2 are compared with Comparative Example 1, it is understood that, in the case where an EVOH resin film is formed using a monomer in which oxygen concentration falls within the specific range of the present application as a vinyl ester monomer at storage, fish eyes in the film is reduced.

While the invention has been described in detail and with reference to specific embodiments thereof, it will be apparent to one skilled in the art that various changes and modifications can be made therein without departing from the spirit and scope thereof. The present application is based on Japanese Patent Application No. 2013-270991 filed on Dec. 27, 2013 and Japanese Patent Application No. 2014-254191 filed on Dec. 16, 2014, and the contents are incorporated herein by reference.

INDUSTRIAL APPLICABILITY

A film using an EVOH resin obtained from the ethylene-vinyl acetate copolymer that is a resulting product of the production method of the present invention has an advantage of reduced fish eyes, and hence is industrially extremely useful.

The invention claimed is:

1. A method for producing an ethylene-vinyl ester copolymer by copolymerizing a vinyl ester monomer and ethylene, wherein the vinyl ester monomer is stored and/or transported in a state of an oxygen concentration of 2 to 8 ppm and subsequently is used for the polymerization with adjusting the oxygen concentration to less than 2 ppm.

2. The method for producing an ethylene-vinyl ester copolymer according to claim 1, wherein the vinyl ester monomer after storage and/or transportation is copolymerized at an oxygen concentration of 1 ppm or less.

3. The method for producing an ethylene-vinyl ester copolymer according to claim 1, wherein the vinyl ester monomer is an aliphatic vinyl ester.

4. The method for producing an ethylene-vinyl ester copolymer according to claim 1, wherein a temperature of the vinyl ester monomer during storage and/or transportation is 38° C. or lower.

5. The method for producing an ethylene-vinyl ester copolymer according to claim 1, wherein a pressure of the vinyl ester monomer during storage and/or transportation is 1 to 10 kPa.

6. The method for producing an ethylene-vinyl ester copolymer according to claim 2, wherein the vinyl ester monomer is an aliphatic vinyl ester.

7. The method for producing an ethylene-vinyl ester copolymer according to claim 2, wherein a temperature of the vinyl ester monomer during storage and/or transportation is 38° C. or lower.

8. The method for producing an ethylene-vinyl ester copolymer according to claim 2, wherein a pressure of the vinyl ester monomer during storage and/or transportation is 1 to 10 kPa.

* * * * *